United States Patent
Pontbriand et al.

(10) Patent No.: US 6,835,428 B1
(45) Date of Patent: Dec. 28, 2004

(54) PLASTIC POWDER FILLED EPOXY PAINT FOR TUBING

(75) Inventors: Duane J. Pontbriand, Metamora, MI (US); Stephen John MacDonald, Bruce Mines (CA)

(73) Assignee: Cooper Technology Services, LLC, Findlay, OH (US)

(*) Notice: Subject to any disclaimer, the term of this patent is extended or adjusted under 35 U.S.C. 154(b) by 0 days.

(21) Appl. No.: 09/493,530

(22) Filed: Jan. 28, 2000

Related U.S. Application Data

(60) Provisional application No. 60/124,751, filed on Mar. 17, 1999.

(51) Int. Cl.[7] .................................................. F16L 9/14
(52) U.S. Cl. ....................... 428/35.9; 428/457; 428/458; 428/626; 428/658; 428/659; 428/908.8; 428/911
(58) Field of Search ............................... 428/35.9, 457, 428/458, 626, 658, 659, 908.8, 911, 35.8, 413, 414, 418, 551, 553, 555, 556, 565; 138/138

(56) References Cited

U.S. PATENT DOCUMENTS

| | | | |
|---|---|---|---|
| 3,927,141 A | 12/1975 | Feldman et al. ............ 260/849 |
| 4,239,807 A | 12/1980 | Feldman et al. ............ 428/462 |
| 4,265,806 A | 5/1981 | Grundmann et al. ....... 260/45.8 |
| 4,268,542 A * | 5/1981 | Sakabara et al. ........... 427/195 |
| 4,469,829 A | 9/1984 | Konietzny et al. .......... 524/103 |
| 4,689,361 A | 8/1987 | Mumcu et al. .............. 524/196 |
| 4,728,693 A | 3/1988 | Dröscher et al. ........... 525/181 |
| 4,853,297 A * | 8/1989 | Takahashi et al. .......... 428/623 |
| 4,948,838 A | 8/1990 | Jadamus et al. .............. 525/66 |
| 5,082,698 A * | 1/1992 | Anderson et al. ........... 427/386 |
| 5,135,991 A | 8/1992 | Suzuki ....................... 525/432 |
| 5,178,902 A * | 1/1993 | Wong et al. ................ 427/470 |
| 5,244,984 A | 9/1993 | Suzuki ....................... 525/432 |
| 5,368,885 A * | 11/1994 | Fotiou ........................ 427/195 |
| 5,378,769 A | 1/1995 | Mügge et al. .............. 525/425 |
| 5,972,450 A * | 10/1999 | Hsich et al. ................ 428/35.9 |
| 5,993,975 A * | 11/1999 | Tanaka et al. .............. 428/458 |
| 6,276,400 B1 * | 8/2001 | Jackson et al. ............. 138/143 |

FOREIGN PATENT DOCUMENTS

| | | |
|---|---|---|
| EP | 468979 B1 | 2/1995 |
| EP | 468979 B1 * | 2/1995 |
| JP | 06329958 A * | 11/1994 |
| WO | WO 9012657 A | 11/1990 |

OTHER PUBLICATIONS

Article: Product Information Vestosint for Coil-Coating-Systems dated Oct. 16, 1998.

Crea Nova Product Information Brochure dated Oct. 16, 1998, 5 pages, German Publication (in English).

* cited by examiner

Primary Examiner—Sandra M. Nolan
(74) Attorney, Agent, or Firm—Carlson, Gaskey & Olds

(57) ABSTRACT

An improved method of applying an epoxy paint coating to a tube includes the step of mixing plastic particles into the epoxy paint prior to application on the tube. The plastic particles improve the paint's abrasion and corrosion resistance and also improves the paint's ability to withstand downstream forming operations.

18 Claims, 1 Drawing Sheet

PLASTIC POWDER FILLED EPOXY PAINT FOR TUBING

This invention relates to an improved epoxy paint for the covering of tubular shapes and relates to provisional application 60/124,751 which was filed Mar. 17, 1999.

BACKGROUND OF THE INVENTION

In the prior art, tubes have been coated with epoxy paint. Typically, a surface treatment is placed on the tube, and the paint surface then covers the surface treatment. Tubes are used in applications where they are exposed to corrosion, chipping, etc. Further the coating may have other characteristics that are not desirable. As an example, the tube may be bent after being formed and painted. The prior art have not always survived the bending to the extent that would be desired.

It has been known to utilize lacquer paints with plastic particle filler as a protective coating for steel sheet and strip products. However, it has not been proposed to utilize such plastic fillers in epoxy paints, and more specifically not epoxy paints for tubes.

SUMMARY OF THE INVENTION

In a disclosed embodiment of this invention, a tube is coated with an epoxy paint containing a percentage of plastic powder. The plastic particles are found in the final coating of the tube and provide several valuable characteristics. In particular, the plastic particles increase the resistance to chipping and corrosion. Also, the particles increase the ability of the tube to be bent and otherwise fabricated without flaking, cracking or damage of the coating. In summary, the plastic particles increase the strength of the coating and if necessary the thickness of the coating without compromising the adhesion of the final topcoat.

The powder-laden paint may be cured using various methods to produce the desired characteristics. Curing methods include but are not limited to induction, convection, infrared and radiant. Other variables in the control of the final coating characteristics include but are not limited to powder concentration; paint viscosity, particle size and shape, and solvents employed. One such processing configuration results with the majority of the plastic particles on the surface of the topcoat creating an electrically insulating coating which is sometimes desired. If a electrically conductive surface is desired the paint can be cured to more evenly disperse the plastic particles throughout the dry film layer.

Preferably, the coating includes approximately 20% plastic particles by weight which is mixed into a fixed viscosity paint. Preferably the viscosity of the paint is low, and on the order of 20 to 30 seconds when measured with a No. 2 Zahn Cup.

More preferably, the powder particles are very small, and on the average less than 20 microns. Under certain applications, particles up to 50 microns on average may be utilized. In one preferred embodiment, a Nylon material is used for the particles. More preferably, the material is Nylon 11 or Nylon 12.

Larger size particles may be best for thicker coatings or a particular surface. As an example, if conductivity is desired on the final tube, larger particles may be utilized as they will tend not to coat the entire outer surface. The use of higher viscosity paint mixtures may also be used to achieve these desired conditions.

These and other features of the present invention can be best understood from the following specification and drawings, the following of which is a brief description.

DETAILED DESCRIPTION OF A PREFERRED EMBODIMENT

Figure 1:
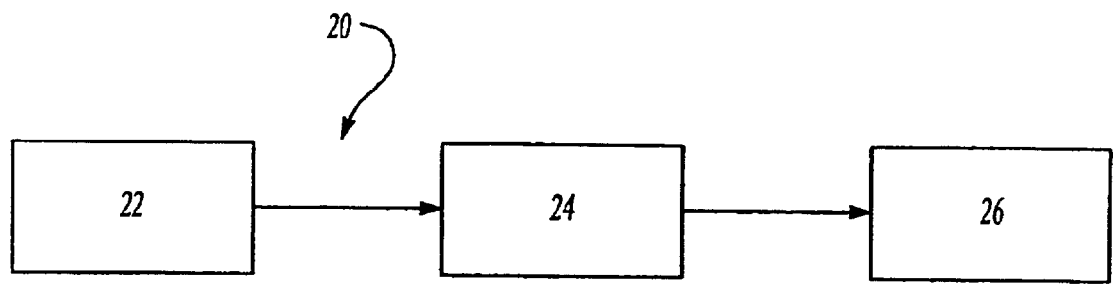
FIG. 1 is a schematic of a tube painting line.

FIG. 1 shows a tube forming line 20 including a tube rolling station 22. Tubing leaving the tube forming station 22 enters a paint bath 24, and then to a paint curing section 26. As known, bath 24 includes paint through which the tubing moves, and heat treatment station at which the paint is cured.

The paint bath preferably includes known epoxy paints for coating tubing. In particular, one known paint may include aluminum flakes. However, other known epoxy paints may be utilized within the teachings of this invention. Plastic particles preferably having a very small size are mixed into the paint bath. In one application the powders have an average size of less than 25 microns. In some applications, powders having average size of less than 50 microns may be utilized. The larger sizes are preferably utilized for thicker paint, or particular surface conductivity.

Preferably the plastic powder is mixed into the paint at about 20% by weight. The paint is preferably a fixed, controlled viscosity paint having a viscosity of between 20 and 30 seconds when measured with a No. 2 Zahn Cup.

Figure 2:
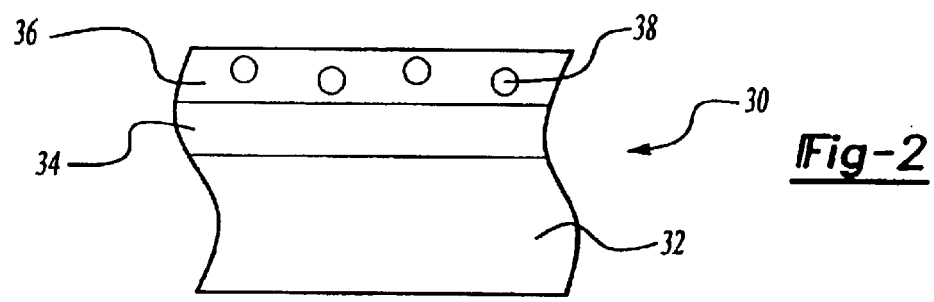
FIG. 2 is a cross sectional view through the tube according to one embodiment of the present invention.

As can be seen from FIG. 2, the tubing 30 includes an underlying ferritic or non-ferritic tube 32 and may include an intermediate substrate 34. The intermediate substrate 34 is formed by any known surface treatment process. Examples are electroplated zinc or a hot dipped application of zinc based alloys.

The outer paint layer 36 is provided by the epoxy paint, which also includes plastic particles 38. In the FIG. 2 embodiment, the plastic particles 38 are disbursed throughout the entire thickness of the paint layer 36. In this embodiment, the plastic particles 38 are disbursed throughout the entire thickness of the paint layer 36. In this embodiment, since the particles do not form a crust at the outer surface of the paint, the tube surface remains conductive.

The plastic particles provide valuable benefits, including increasing the resistance to chipping and corrosion, and allowing the tube to be bent without damage to the coating.

Figure 3:
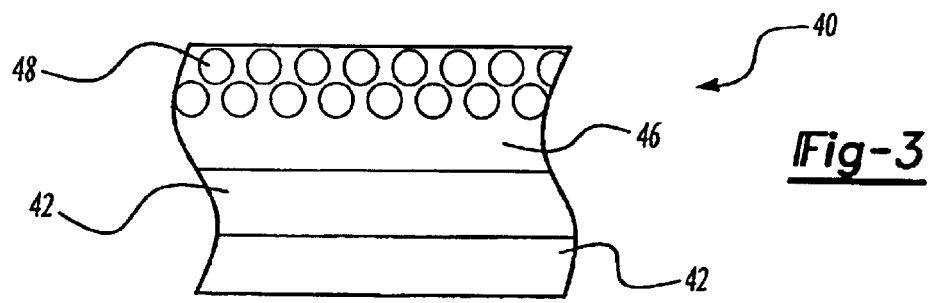
FIG. 3 shows a second embodiment of the present invention.

FIG. 3 shows another embodiment tube 40 having an underlying steel surface 42. A substrate formed as in the previous embodiment. In the FIG. 3 embodiment, the coating layer 46 has the bulk of the particles 48 move outwardly to form a crust at the outer surface of the coating layer. This crust will provide an electrically insulated barrier between a conductive inner tube material and potential ground paths from sources of electrical current.

The present invention provides an improved coating for tubing being painted by epoxy paint. Although a preferred embodiment of this invention has been disclosed, a worker of ordinary skill in this art would recognize that certain modifications would come within the scope of this invention. For that reason, the following claims should be studied to determine the true scope and content.

What is claimed is:

1. A method of coating a metal tubing comprising the steps of:
   (1) applying a substrate to said metal tubing;
   (2) applying an epoxy coating containing epoxy paint and plastic particles onto an outer surface of said substrate; and
   (3) curing said coating on said metal tubing.

2. The method as set forth in claim 1, wherein said coating is applied to said tubing in a paint bath.

3. The method as recited in claim 1, wherein said plastic particles are nylon.

4. The method as set forth in claim 1, wherein said plastic particles have an average size of less than 50 micron.

5. The method as set forth in claim 1, wherein said plastic particles have an average size of less than 25 micron.

6. The method as set forth in claim 1, wherein said coating includes about 20% by weight of said plastic particles.

7. The method as set forth in claim 1, wherein said substrate is electroplated zinc.

8. The method as set forth in claim 1, wherein said substrate is zinc based alloy.

9. A method of coating a metal tubing comprising the steps of:
   (1) applying a substrate to said metal tubing;
   (2) applying an epoxy coating containing epoxy paint and plastic particles onto an outer surface of said substrate; and
   (3) curing said coating on said metal tubing, so that said plastic particles in said epoxy coating form a crust.

10. The method as set forth in claim 9, wherein said crust provides an electrically insulated barrier.

11. A tube comprising:
    an underlying metal tubing;
    an intermediate substrate layer; and
    an outer epoxy coating containing plastic particles mixed into an epoxy paint, wherein said intermediate substrate layer is between said metal tubing and said coating.

12. The tube as set forth in claim 11, wherein said plastic particles have an average particle size of less than 50 micron.

13. The tube as set forth in claim 11, wherein said plastic particles have an average size of less than 25 micron.

14. The tube as set forth in claim 11, wherein said plastic particles are formed of a nylon.

15. The tube as set forth in claim 11, wherein said intermediate substrate layer is electroplated zinc.

16. The tube as set forth in claim 11, wherein said intermediate substrate layer is zinc based alloy.

17. A tube comprising:
    an underlying metal tubing;
    an intermediate substrate layer;
    an outer epoxy coating containing plastic particles mixed into an epoxy paint, wherein said intermediate substrate layer is between said metal tubing and said coating;
    a crust formed by said plastic particles in said outer epoxy coating.

18. The tube as set forth in claim 17 wherein said crust provides an electrically insulated barrier.

* * * * *